73. MEASURING AND TESTING.

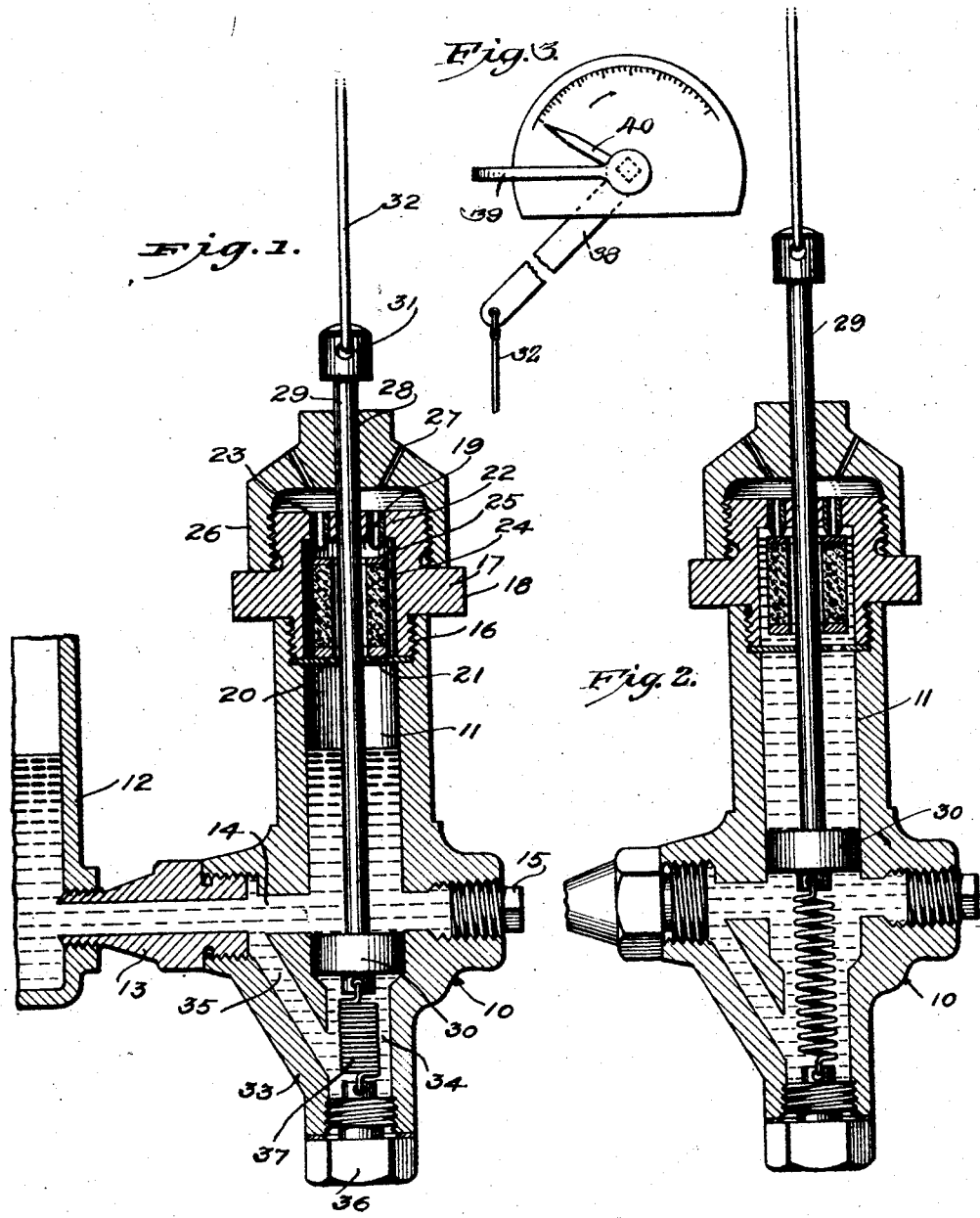
Feb. 17, 1925.
A. L. ROSENMUND
OIL LEVEL INDICATOR
Filed Jan. 30, 1922
1,526,377
Inventor
Alfred L. Rosenmund
By George Cook + Son
Attorneys

Patented Feb. 17, 1925.

1,526,377

UNITED STATES PATENT OFFICE.

ALFRED L. ROSENMUND, OF PATERSON, NEW JERSEY, ASSIGNOR TO MASTER MANUFACTURING COMPANY, OF NEWARK, NEW JERSEY, A CORPORATION OF NEW JERSEY.

OIL-LEVEL INDICATOR.

Application filed January 30, 1922. Serial No. 532,708.

*To all whom it may concern:*

Be it known that I, ALFRED L. ROSENMUND, a citizen of Switzerland, and a resident of Paterson, in the county of Passaic and State of New Jersey, have made and invented certain new and useful Improvements in Oil-Level Indicators, of which the following is a specification.

My invention relates to a device for indicating the level of a liquid, and more particularly to an apparatus for positively indicating the level of the oil within the crank case of an automobile. While my device is particularly designed for such usage, it will be readily apparent, particularly as the description proceeds, that it may be used in other relations and wherever a positive reading or positive indication of the level of a liquid within a receptacle or compartment is desired.

An object of the present invention is to improve the construction and simplify the design of an oil level indicator such as described in my copending application, Serial Number 496,857, filed August 30th, 1921.

A further object is to provide a device for indicating the level of oil within a receptacle by first entrapping the oil within the cylinder which communicates with the receptacle and then getting the volume, and therefore the height or depth of column, of the entrapped oil, and which in turn is an indication of the level of the liquid within the receptacle, and to so arrange the construction that the piston, the movement of which is checked by the entrapped oil, also acts as a valve to shut off and close the passages and thus prevent the escapement of the entrapped oil.

A further object is to provide a device of the character described wherein an accumulating or overflow chamber is provided for any oil or liquid which may be forced through the air vent.

A further object is to provide an oil level indicator wherein a single spring serves to hold the piston in a lowered position, allowing the free access of oil or liquid to the chamber or cylinder of the device, and which spring will further act to retract the piston after a reading or indication has been taken.

A further object is to provide an oil level indicator which may be easily cleaned or drained of the oil and any sediment which may be therein, a suitable chamber being provided for the accumulation of the sediment so as not to in any way interfere with the free and proper action of the device at all times.

A further object is to provide a device of the character indicated which may be readily turned out on either automatic or screw machines, so that the entire device may be economically manufactured, and with the foregoing and other objects, my invention consists in the improved oil level indicator illustrated in the accompanying drawing and hereinafter described and claimed, and in such variations and modifications thereof as will be obvious to those skilled in the art to which my invention relates, it being understood that changes may be made within the scope of what is claimed without departing from the spirit of the invention.

In the accompanying drawing:

Figure 1 is a view in vertical section of a level indicator embodying the characteristic features of my invention and showing the same in normal position, the oil or liquid having free access to the cylindrical body of the apparatus.

Figure 2 is a similar view showing the device with the piston raised and the liquid or oil entrapped in the cylindrical body and thus giving an indication of the amount of liquid or oil which was in the device and accordingly indicating the level of the oil or liquid within the tank or crank case with which the cylindrical body of the indicator communicated.

Figure 3 is a detail view of one form of indicating dial and associate parts whereby the reading as to the level of the oil is taken.

Referring specifically to the several views, wherein similar reference numerals designate corresponding parts throughout, my improved oil or liquid indicating device is made up of a body 10 having a cylindrical chamber 11, which is adapted to communicate with a tank or crank case 12 through the intervention of a suitable nozzle or connection 13. In order that the cylindrical chamber 11 will communicate with the nozzle 13 it is provided at its lower end with the transverse duct or opening 14, one end of which communicates with the nozzle 13 and the opposite end is normally closed by a plug or stop 15, the latter allowing the oil or liquid to be readily drained from the chamber when desired, or allowing a pin or wire to be thrust through the duct 14 and into the crank case 12 in case there may be a stoppage due to an accumulation of sediment or the presence of foreign material in the various passageways or ducts. The upper extremity of the body 10 is counter-bored and threaded as at 16 and to which is secured the head 17, the latter being provided with a suitable wrench-engaging flange 18. The head threadedly engages the body and is provided with a chamber 19 therein, normally closed at its lower extremity by the washer or plate 20, the latter, however, being provided with a suitable opening 21 extending therethrough, so that the chamber 19 is in constant communication with the cylindrical chamber 11 of the body. The upper extremity of the chamber 19 is closed by the top wall, through which extend the nipples 23, the same projecting down within the chamber a slight distance and acting in the capacity of valves or vents and providing for the escapement of air but adapted to prevent the escapement of oil or liquid therethrough, as will be hereinafter more fully described. Located within the chamber 19 and normally supported by the plate 20 is the float valve 24, the same being preferably formed of cork or some other light substance and provided at its upper surface with the valve plate 25 which is adapted, when raised, to contact with the lower extremities of the nipples 23 and thus effectually close and seal the same. In order to prevent any dirt or foreign material from entering within the interior of the parts as thus described, a suitable closing cap 26 is provided which threadedly engages the head 17 and is provided with small air vents 27 extending through the side walls thereof.

The plate or washer 20, upper wall 22 of the head, and the cap 26, are provided with the aligned openings 28 through which extends the piston rod 29, the same being provided with the piston 30 at its lower extremity. The piston rod is provided with a suitable opening 31 or other means whereby a flexible element 32 may be attached to the piston rod and will serve to forcibly raise the same and the amount of raising of the piston rod will be an indication of the level of the oil within the crank case 12, as will presently appear. The body 10 is provided with the downwardly projecting chamber 33 which communicates both with the cylinder 11 through the opening 34, and with the transverse passage 14 through the duct 35. The lower extremity of the chamber 33 is closed by the plug 36 and to which a coil tension spring 37 is attached. The upper extremity of the tension spring is secured to the lower extremity of the piston and normally holds the same in a retracted or lowered position and in which position the piston 30 is located or stationed below the transverse duct 14, so that the cylindrical chamber 11 is in connection with the crank case or tank 12 and thus the liquid within the crank case or tank has free access to the cylinder 11 and will take up a level therein corresponding to the level within the tank or crank case. A dial is shown in Figure 3, together with associate parts, and the flexible element 32 is connected to the crank arm 38, so that when the handle 39 is turned the piston rod 29 will be raised and the pointer 40 will give a direct scale reading of the extent to which the piston rod has been raised.

With the parts as thus arranged, the operation of the device is substantially as follows:

The piston rod is normally in a retracted position, due to the spring 37, and the oil or liquid flows freely into the cylinder and assumes a height therein such as shown in Figure 1. When it is now desired to ascertain the height of the liquid within the tank or crank case 12, the piston rod 29 is forcibly raised and as the piston passes above the duct 14 the liquid which is located within the cylinder and above the piston is accordingly entrapped therein. As the piston is now raised, the air is forced out of the cylinder above the oil and the oil and piston moved upwardly until the float valve 25 is forcibly raised, due to the liquid, and which action closes the air vents in the top of the head 17, and with the closing of the vent the upward movement of the piston rod is abruptly checked and no further movement of the piston can take place regardless of the amount of force applied to the same, as the oil or liquid is incompressible. A positive indication of the amount of liquid within the cylinder 11, and accordingly the level of liquid within the crank case or tank 12, is thus had. I do not wish to limit myself to the form of indicating dial or device, as illustrated in Figure 3, as it will be readily appreciated that it may partake of any desired form or in fact the flexible element and scale indicator may be entirely dispensed with and the upper protruding extremity of the piston rod grasped and raised and the extent of the raising of the top of the piston rod above the top of the cap 26 will be an indication of the level of the liquid in the vessel which communicates with my device. After the indication or reading has thus been taken, the flexible element 32 or handle is released and the piston will again be lowered, due to the action of the tension spring 37. As the piston is again lowered below the duct 14 the cylinder is again brought into communication with the liquid within the crank case 12 and accordingly in position to again indicate the level of the liquid therein. The piston is not hindered or prevented from assuming its lowered and seated position as the oil therebelow is forced down through the chamber 34 and up around the duct 35. The indicator as thus constructed is exceedingly simple in design and operation, and rugged and durable, in service. The downwardly extending chamber 33 provides for the accumulation of any sediment or foreign material and which may be removed by first removing the closing plug 36.

Having thus described and explained my invention, I claim and desire to secure by Letters Patent:

1. A liquid level indicator comprising a cylinder, a liquid inlet communicating therewith, a piston slidably mounted in said cylinder and normally located below the said liquid inlet, a piston rod engaging said piston and adapted to forcibly raise the same, to move said piston above said inlet port and entrap the liquid within said cylinder, and means communicating with said cylinder adapted to allow the escapement of air but prevent the escapement of liquid from said cylinder.

2. A liquid level indicator comprising a chamber or cylinder having a liquid inlet adjacent the lower extremity thereof, means communicating with the upper portion of said cylinder adapted to allow the escapement of air but prevent the escapement of a liquid from said cylinder, a piston slidably mounted within said cylinder, means adapted to forcibly raise said piston to entrap the liquid within the cylinder and adapted to indicate the height or level of the liquid within said cylinder and within a vessel with which said cylinder communicates.

3. A liquid level indicator comprising a cylinder having a liquid inlet adjacent the lower extremity thereof, a piston slidably mounted in said cylinder and normally disposed below said liquid inlet, resilient means adapted to hold said piston in the said retracted position, means adjacent the top of the cylinder adapted to allow the passage of air to and from said cylinder and prevent the escapement of liquid from said cylinder, and means adapted to forcibly raise said piston to entrap the liquid within the cylinder and thus by the extent of its movement indicate the volume or height of liquid within said cylinder.

4. A liquid level indicator comprising a cylinder, having an inlet adjacent the bottom thereof, a piston slidably mounted within said cylinder, means for normally holding said piston below said liquid inlet, means for forcibly raising said piston, and an automatic valve allowing the passage of air and a liquid into the upper portion of said cylinder and allowing the escapement of air from said cylinder and preventing the escapement of a liquid from said cylinder, the said means for forcibly raising said piston adapted to indicate the movement of said piston and accordingly indicate the level of the liquid within said cylinder before said piston was forcibly raised.

5. A liquid level indicator comprising a body having a cylindrical portion with an inlet communicating with said cylindrical portion adjacent the lower extremity thereof, a piston located within said cylinder, resilient means for normally holding it adjacent the bottom of said cylinder and below said level inlet, said body provided with a by-pass extending from below the seated position of said piston to the said liquid inlet, means for forcibly raising said piston to cause said piston to act as a valve closing the interior of the cylinder to said liquid inlet, and automatic means for allowing the passage of air to and from said cylinder and allowing the passage of a liquid to, but preventing its escapement from, said cylinder, the said means for forcibly raising said piston adapted to indicate the movement of said piston and accordingly indicate the level of the liquid within said cylinder before said piston was forcibly raised.

6. A liquid level indicator comprising a body having a cylindrical portion with a liquid inlet communicating therewith, adjacent the lower extremity thereof, said liquid inlet extending completely through said body, a plug for closing the outer free extremity of said inlet, the remote extremity of said inlet adapted to communicate with the crank case of an automobile, a piston slidably mounted within said cylindrical portion and normally disposed below said liquid inlet, allowing the free passage of the liquid through said liquid inlet into said cylindrical portion above said piston, a valve communicating with the upper portion of said cylinder, allowing the free passage of air to and from said cylinder, and allowing the passage of a liquid to said cylinder but preventing its escapement therefrom, and means for forcibly raising said piston to entrap the liquid within the cylinder above said liquid inlet and thereby indicate the level of the liquid which was in the said cylinder prior to the raising of the piston.

7. A liquid level indicator comprising a body having a cylindrical portion and a liquid inlet communicating with the bottom portion of said cylindrical portion, a piston slidably mounted within said cylinder, resilient means adapted to hold said piston normally below the said liquid inlet, a by-pass preventing the trapping of oil below said piston as the latter returns to its seated or lowermost position, said by-pass serving as a chamber for the collection of sediment therein, and a valve communicating with the upper extremity of said cylindrical portion, allowing the escapement of air as the piston and liquid within the cylinder is raised, preventing the escapement of the liquid after the air has been expelled, and allowing the return of air to said cylinder as the piston is retracted to its lowermost position and means engaging said piston adapted to forcibly raise the same and adapted to indicate by the extent of its movement the level of the liquid within the cylinder prior to the raising of said piston.

8. A liquid level indicator comprising a body having a cylindrical portion with an inlet port communicating with the lower extremity of said cylindrical portion, a piston slidably mounted within said cylindrical portion, resilient means adapted to normally hold said piston in a retracted and lowered position and below said inlet port, a by-pass extending below the seated position of said piston, preventing the trapping of oil therebelow and providing for the collection of sediment therein, a plug for rendering accessible the said by-pass and the removal of sediment therefrom, a plug normally closing the outer free extremity of said inlet and rendering the same accessible for cleaning, and a valve communicating with the upper extremity of said cylinder, allowing the escapement of air but preventing the escapement of the liquid from the cylinder as the piston is raised, and allowing the return of the air as the piston is lowered and means engaging said piston adapted to forcibly raise the same and adapted to indicate by the extent of its movement the level of the liquid within the cylinder prior to the raising of said piston.

9. A liquid level indicator comprising a cylinder, a liquid inlet communicating therewith, a piston slidably mounted in said cylinder and normally located below the said liquid inlet, a piston rod engaging said piston and adapted to forcibly raise the same to move said piston above said inlet port and entrap the liquid within said cylinder, there being provision at the top of said cylinder adapted to allow the escapement of air and prevent escapement of liquid.

10. A device of the character described comprising a chamber adapted near its lower end for communication with a container holding liquid, a piston slidably mounted in the chamber so that when moved from the lower limit of its travel it will shut off communication between the liquid above it and that in said container and thereby trap such liquid in said chamber, means to permit gas to be forced from said cylinder but to impede the passage of liquid, and means associated with said piston to indicate the position of the latter.

11. A liquid level indicator including in combination a cylinder having a liquid inlet adjacent to its lower end, a piston positioned at the bottom of its stroke below said inlet, a connection for raising the piston to trap the liquid in the cylinder above said inlet, a valve mechanism at the top of the cylinder normally open to permit escape of gas from the cylinder and which is closed by the rising liquid to prevent escape of the liquid from the cylinder.

12. A liquid level indicator including in combination a cylinder having a liquid inlet adjacent to its lower end, a piston positioned at the bottom of its stroke below said inlet, a connection for raising the piston to trap the liquid in the cylinder above said inlet, a valve mechanism at the top of the cylinder normally open to permit escape of gas from the cylinder and which is closed by the rising liquid to prevent escape of the liquid from the cylinder, and means operating automatically to restore the piston to its bottom position in the cylinder.

13. A liquid level indicator including in combination a cylinder having a liquid inlet adjacent to its lower end, a piston positioned at the bottom of its stroke below said inlet, a connection for raising the piston to trap the liquid in the cylinder above said inlet, a valve mechanism at the top of the cylinder normally open to permit escape of gas from the cylinder and which is closed by the rising liquid to prevent escape of the liquid from the cylinder, and a spring for restoring the piston to its bottom position in the cylinder.

14. A liquid level indicator including in combination a cylinder having a liquid inlet adjacent to its lower end, a piston positioned at the bottom of its stroke below said inlet, a connection for raising the piston to trap the liquid in the cylinder above said inlet, a valve mechanism at the top of the cylinder normally open to permit escape of gas from the cylinder and which is closed by the rising liquid to prevent escape of the liquid from the cylinder, the valve mechanism including downwardly projecting orificed members and a float valve adapted to impinge against said members to prevent escape of the liquid from the cylinder.

15. A liquid level indicator including in combination a cylinder having a liquid inlet adjacent to its lower end, a piston positioned at the bottom of its stroke below said inlet, a connection for raising the piston to trap the liquid in the cylinder above said inlet, a valve mechanism at the top of the cylinder normally open to permit escape of gas from the cylinder and which is closed by the rising liquid to prevent escape of the liquid from the cylinder, a liquid containing chamber below the bottom position of the piston and communicating with the cylinder and a bypass into said chamber from said inlet exteriorly to the cylinder.

Signed at New York, borough of Manhattan, in the county of New York and State of New York, this 16th day of January, A. D. 1922.

ALFRED L. ROSENMUND.

Witnesses:
A. M. LINDENSTRUTH,
ANNE V. WALSH.